(12) United States Patent  
Sun et al.

(10) Patent No.: US 8,473,123 B2
(45) Date of Patent: Jun. 25, 2013

(54) PROGRAMMABLE SURFACE

(75) Inventors: Amy Sun, Somerville, MA (US); Neil Gershenfeld, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 274 days.

(21) Appl. No.: 13/031,062

(22) Filed: Feb. 18, 2011

(65) Prior Publication Data
US 2012/0158215 A1 Jun. 21, 2012

Related U.S. Application Data

(60) Provisional application No. 61/305,920, filed on Feb. 18, 2010.

(51) Int. Cl.
*G01C 23/00* (2006.01)
(52) U.S. Cl.
USPC ............ 701/3; 244/12.4; 244/12.3; 244/12.1; 701/4

(58) Field of Classification Search
USPC ................. 701/3, 99, 4, 16; 244/110 B, 12.5, 244/12.4, 105, 12.3, 12.1, 17.19, 171.2, 76 R, 244/23 A; 239/265.39
See application file for complete search history.

(56) References Cited

U.S. PATENT DOCUMENTS

2011/0202205 A1 * 8/2011 Pepitone et al. .................. 701/3

\* cited by examiner

*Primary Examiner* — Behrang Badii
(74) *Attorney, Agent, or Firm* — Stephen R. Otis

(57) ABSTRACT

In exemplary embodiments of this invention, a programmable surface comprises an array of cells. Each of the cells can communicate electronically with adjacent cells in the array, can compute, and can generate either normal thrust or shear thrust. Distributed computing is employed. The programmable surface may cover all or part of the exterior of a craft, such as an aircraft or marine vessel. Or, instead, the programmable surface may comprise the craft itself, which may, for example, take the form of a "flying carpet" or "flying sphere". The thrust generated by the programmable surface can be employed directly to provide lift. Or it can be used to control the orientation of the craft, by varying the relative amount of thrust outputted by the respective cells. The number of cells employed may be changed on a mission-by-mission basis, to achieve "span on demand". Each cell may carry its own payload.

17 Claims, 18 Drawing Sheets

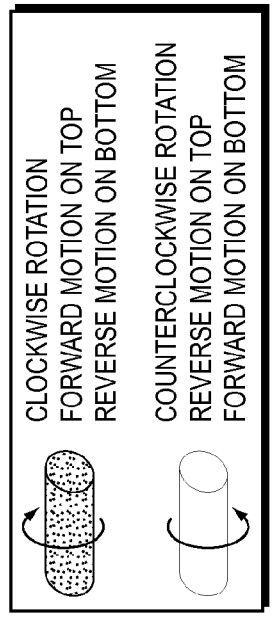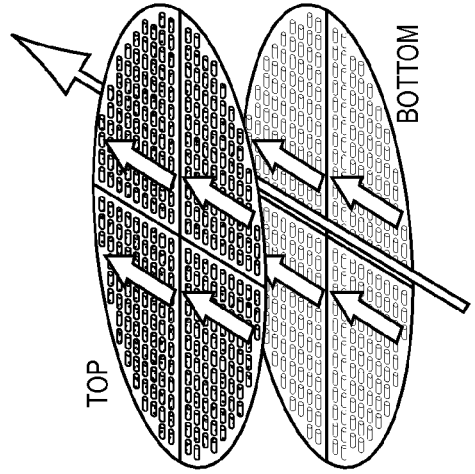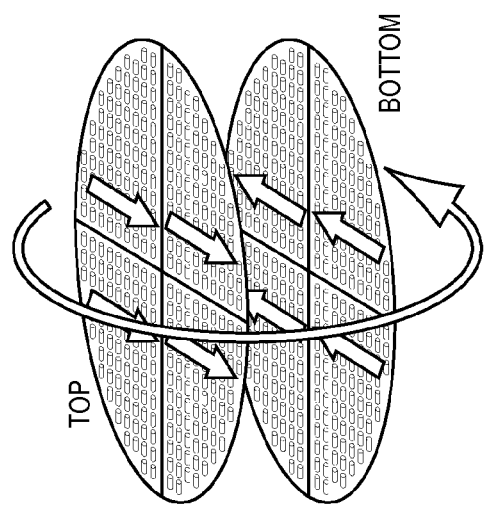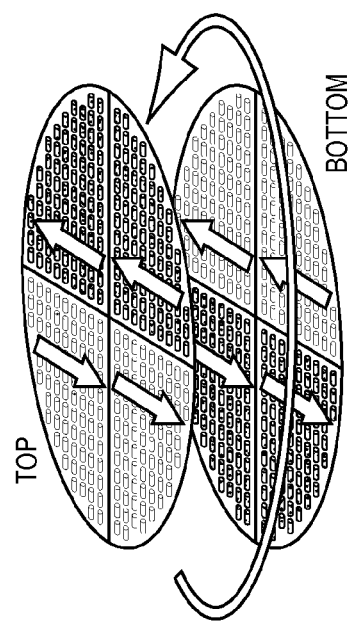
FIG. 16A  FIG. 16B  FIG. 16C

_US 8,473,123 B2_

PROGRAMMABLE SURFACE

RELATED APPLICATIONS

This application claims the benefit of U.S. Provisional Application Ser. No. 61/305,920, filed Feb. 18, 2010, the entire disclosure of which is herein incorporated by reference.

STATEMENT REGARDING FEDERALLY SPONSORED RESEARCH OR DEVELOPMENT

This invention was made with U.S. government support under Grant Number W911NF-08-0254, awarded by the Defense Advanced Research Projects Agency and the Army Research Office. The government has certain rights in this invention.

FIELD OF THE TECHNOLOGY

The present invention relates generally to the generation and control of distributed forces.

SUMMARY

In exemplary embodiments of this invention, a programmable surface comprises an array of cells. Each of the cells can communicate electronically with adjacent cells in the array, can perform computations, and can generate thrust. Distributed or spatial computing is employed.

The programmable surface may cover all or part of the exterior of a craft, such as an aircraft or marine vessel.

Or, instead, the programmable surface may comprise the craft itself, and the craft may lack a conventional fuselage or wings (in the case of an aircraft) or hull (in the case of a ship).

In an exemplary embodiment of this invention, the aircraft is a "flying carpet" comprising a programmable surface. The surface comprises many modules, each of which can communicate electronically with adjacent modules and can perform computations. Also, each of the modules can generate thrust that is substantially normal to the local orientation of the programmable surface ("normal thrust"). The normal thrust is generated by a thrust generator, such as a propeller, jet engine, other actuator disk, synjet or ion thruster. For example, a propeller driven by an electromechanical actuator may generate thrust. The programmable surface may comprise primarily empty space through which the air may pass.

The normal thrust generated by the programmable surface can be employed directly to provide lift. Furthermore, the normal thrust can be used to control the direction of motion and angular orientation of the "flying carpet", by varying the amount of thrust outputted by the respective modules. For example, if normal thrust on the left side of the "flying carpet" is increased while it is decreased on the right side, this may cause the flying carpet to tilt, with its left side tilting up and the right side tilting down. Any combination of roll, pitch and yaw may be achieved in this manner.

The modules may be easily attached or detached, which permits "span on demand". In other words, the number of modules employed by the aircraft may be easily varied on different flights. Thus, the programmable surface may be incrementally scaled, to precisely match loads by increasing the number of cells, on a mission-by-mission basis. This is highly advantageous, compared to conventional technology where the size of the craft is fixed and not precisely calibrated to the payload of a particular mission. (For example, consider a conventional fleet of four different sizes of helicopters. A payload may be too heavy for the three smaller types, yet the largest type of helicopter may too large for that payload, resulting in wasted cargo space, larger than needed cross-section increasing drag, excessive structural elements to support the payload, etc.)

In some embodiments, the interconnections between the modules may be flexible. This makes the programmable surface flexible. In some instantiations, cells on a flexible programmable surface may be used as a deformable array for transmitting and receiving signals, (e.g., radar, sonar, RF). Furthermore, an array of sensors may be distributed over cells of the programmable surface. For example, a camera may be located on each cell, forming an array for synthetic aperture imaging. Or, for example, a radar resonator may be located on each cell, forming an array for synthetic aperture radar.

In another implementation, a programmable surface may comprise an aircraft in the shape of a polyhedron. The polyhedron may have a sufficiently large number of symmetrical sides that its shape approximates a sphere. Such a "flying sphere" lacks a conventional fuselage.

In this implementation, each side of the "flying sphere" comprises one or more cells. Each of these cells can compute, communicate electronically with neighboring cells, and generate normal thrust. The structural elements of the "flying sphere" may comprise strong, lightweight, composite material. The "flying sphere", which may comprise primarily empty space through which air may flow.

By varying the relative output of the thrust generators in the respective cells, the "flying sphere" may be made to roll on the ground, or lift off, or change its angular orientation or direction of motion during flight.

In exemplary embodiments of a "flying carpet" or "flying sphere", the net thrust vector is directly controlled, by adjusting the relative amount of thrust generated by the different cells. There is no need for moving control surfaces, or for structural elements to connect the thrust generator and moving control surfaces.

Furthermore, each module may carry its own payload, so that (at least for those payloads) lift and weight are in the same area. This eliminates or reduces the need for structural elements to carry load between widely separated portions of the craft where weight is located and where lift is generated. Indeed, this invention may even by implemented with interconnections between modules that are so flexible that they are not load-bearing.

In exemplary embodiments, the net thrust vector may be pointed in any 3D direction relative to the craft's inertial frame of reference, by varying the relative amount of thrust generated by different cells in the array. This allows transport to occur in any arbitrary direction. (Note that the net thrust vector may be varied, even though the thrust generated by each cell is normal to the programmable surface's local orientation).

A programmable surface with many little cells may generate a large amount of thrust, because the cells may exhaust a large mass of air (or other fluid) per unit of time. Thrust is equal to mass flow rate times the exhaust velocity, and therefore scales linearly with mass flow rate. Because the cells may push a relatively large mass of air or other fluid through them per unit of time, a high level of thrust can be achieved, even though the exhaust velocity is low.

The programmable surface may be tilted from the direction of travel of the craft (e.g. by only 3 or 4 degrees). In that case, the net thrust vector may include a component pointed in the direction of travel, and thus normal thrust may be used to propel the aircraft at high speeds.

A programmable surface with many small cells with little propellers may have a low noise signature, for the following reasons: First, as a general matter, the shorter the propeller blade, the higher the acoustic frequency of the noise produced. Sounds with higher acoustic frequency tend to dissipate over a shorter distance than sounds of higher acoustic frequency. Second, the use of many small blades creates a more spatially uniform mass flux than would be achieved by a large, single, conventional propeller. The more uniform mass flux also tends to reduce the craft's noise signature.

In exemplary embodiments, both actuation and controls are distributed among many little cells. This makes the system robust against the failure of individual cells.

In exemplary embodiments, boundary layer conditions and the aerodynamic profile of the aircraft may be manipulated by varying the amount of thrust generated by different cells, respectively, at a given time. For example, the aerodynamic profile of the aircraft (and boundary layer conditions) may be altered by causing cells in the center of the aircraft's surface to generate more thrust than cells at the periphery of the surface.

In some embodiments, the hull of a vessel below the waterline is covered by a programmable surface, comprised of many little cells. In this case, each of the cells can generate thrust in a direction substantially parallel to the programmable surface's local orientation ("shear thrust"). For example, the shear thrust may be generated by rollers driven by an electromechanical actuator.

The shear thrust may be used for propulsion or for reducing the vessel's speed. For example, rollers may generate thrust in the direction of the vessel's motion, thereby propelling the vessel. If the rollers spin in the opposite direction, they may generate thrust that is opposite in direction to the vessel's motion, thereby tending to slow the vessel. Alternately, in order to slow a vessel, the rollers may absorb kinetic energy. In this case, the rollers may be passively spun by the passing water, and that spinning may be used to store energy.

Furthermore, shear thrust may be used for control. By varying the relative amounts of shear thrust generated by different parts of the programmable surface, the vessel may be steered. For example, if more shear thrust is generated on the fore portion of the port side of the vessel than on the aft portion of the starboard side (and the thrust in both cases is in the vessel's direction of motion), this may cause the vessel to tend to turn to starboard. This steering effect may be even stronger if the thrust is reversed on one side. For example, if shear thrust is generated on the fore portion of the port side in the direction of the vessel's motion, and shear thrust is generated on the aft portion of the starboard side in the opposite direction, this will tend to make the vessel turn to starboard.

The spinning rollers may be used to reduce viscous drag (i.e., skin drag and body drag) on the vessel, by reducing the difference between the velocity of the surrounding fluid and the apparent velocity of the surface of the vessel. This favorably alters boundary layer conditions, resulting in more laminar flow, which is more hydrodynamically efficient.

Likewise, an aircraft may be covered in whole or part by a programmable surface with many little cells, each of which generates shear thrust. Again, by varying the relative amount of shear force generated in different cells, the direction of motion or angular orientation of the aircraft may be controlled (or conventional controls may be enhanced).

In some embodiments, a programmable surface with many little cells may line the interior of a pipe. The cells may generate shear thrust to move fluid along the pipe. Also, spinning rollers in the programmable surface may be used to reduce or eliminate the difference between the velocity of the fluid in the pipeline and the apparent velocity of the programmable surface. This may be used to advantage to make the flow in the pipe more laminar, and thus more hydrodynamically efficient.

In alternate embodiments, a programmable surface may be used to generate energy. For example, a programmable surface may cover all or part of a building or the interior of a pipe, or may be freestanding in a wind farm. In these embodiments, the programmable surface has many little cells, each of which has at least one roller that captures kinetic energy from passing fluid (e.g., air or water). Fluid flow over the spinning rollers tends to be laminar, rather than turbulent. This is advantageous, because it permits the programmable surfaces to be stacked in a 2D or 3D array in a wind farm, so that some are upwind of others.

The above description of the present invention is just a summary. It is intended only to give a general introduction to some illustrative implementations of this invention. It does not describe all of the details of this invention. This invention may be implemented in many other ways.

BRIEF DESCRIPTION OF THE DRAWINGS

FIGS. 16A, 16B and 16C each show rotation of rollers being used to control direction and angular orientation of a craft.

The above Figures illustrate some illustrative implementations of this invention, or provide information that relates to those implementations. However, this invention may be implemented in many other ways. The above Figures do not show all of the details of this invention.

DETAILED DESCRIPTION

First, a few definitions. As used herein:

"Craft" or "vessel" means an aircraft, watercraft, boat, ship, or marine vessel.

"Fluid" means gases (e.g., air) and fluid liquids (e.g. water).

The "local orientation" of a programmable surface is the plane (if the surface is flat) or tangent plane (if the surface is curved) of that programmable surface at a particular point. For example, a cell generates thrust that is perpendicular to a surface's "local orientation" if such thrust is perpendicular to the orientation of the surface at that cell.

"Normal thrust" means thrust that is substantially normal to a surface's local orientation.

"Shear thrust" means thrust that is substantially parallel to a surface's local orientation.

"Substantially" means approximately, within a range of plus or minus 15%. For example, thrust is "substantially" normal to a flat surface if it is within 15 degrees of perpendicular to that surface.

The terms "aerodynamic" and "hydrodynamic" (and grammatical variations thereof such as "aerodynamically" or "hydrodynamically") shall each be construed broadly to include the other, and to include all other types of fluid dynamics.

Figure 1:
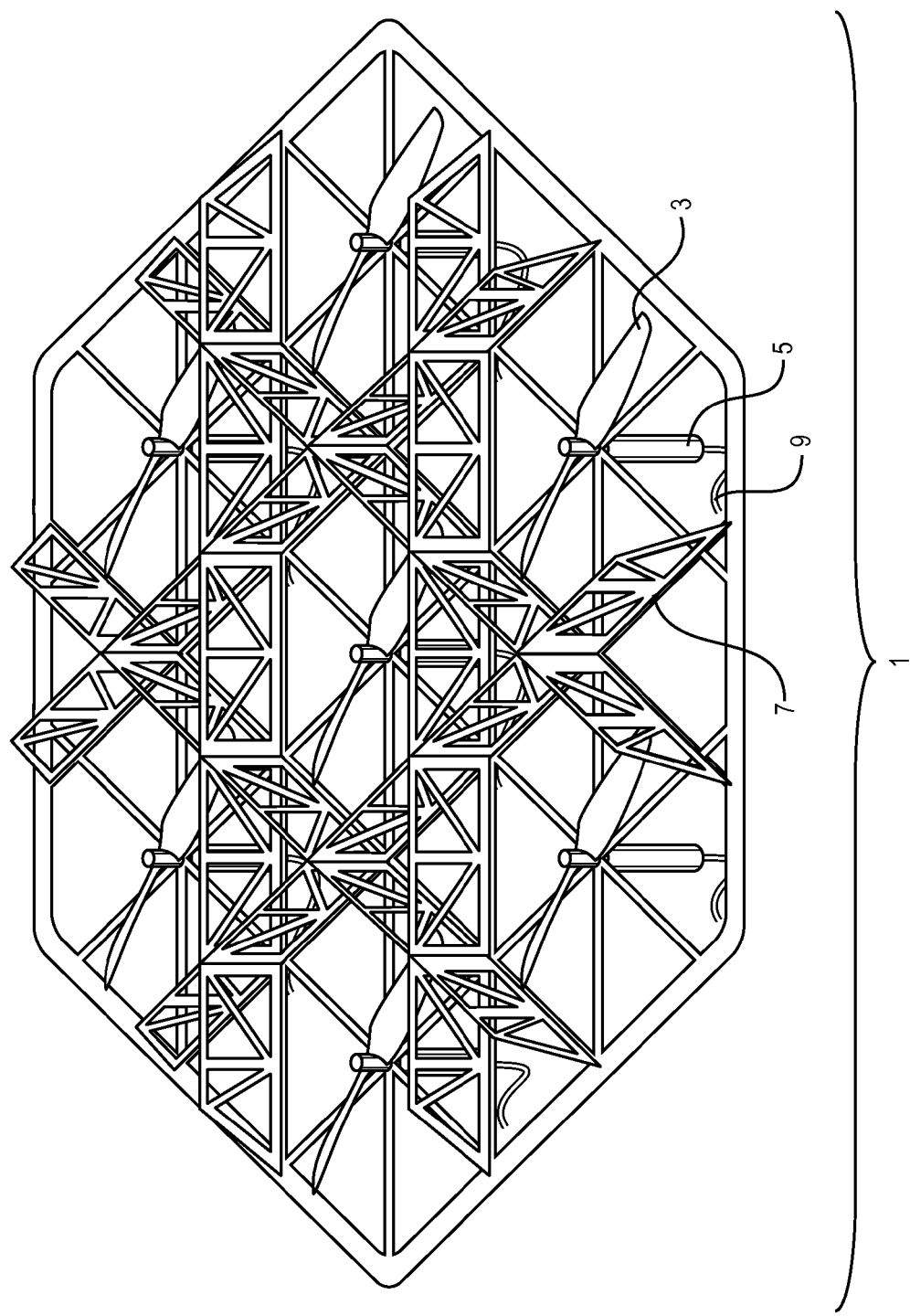
FIG. 1 is a perspective view of a hexagonal module with seven propellers.

FIG. 1 is a perspective view of a hexagonal module 1 with seven propellers (such as propeller 3). Each propeller is driven by an electric motor (e.g., 5). Structural elements (e.g., 7) support the seven propeller/motor units in the module. Wiring (e.g., 9) is adapted to connect each motor/propeller with a processor and power source in the module. The processor, power source and electronic and mechanical interconnections with other modules are not shown in FIG. 1.

Figure 2B:
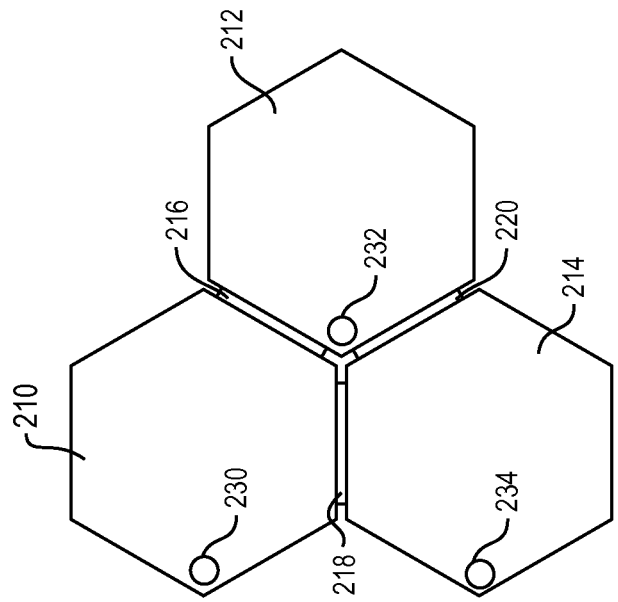
FIG. 2B shows three modules with flexible attachments between them.
Figure 2A:
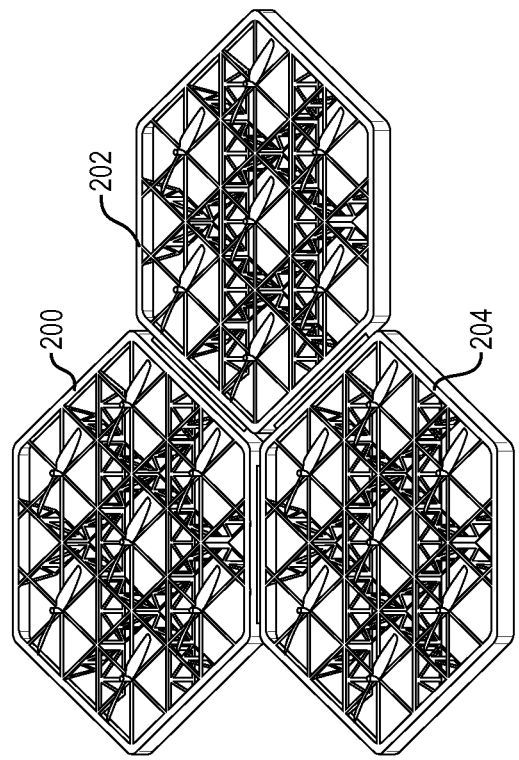
FIG. 2A shows three modules attached together.

FIG. 2A is a perspective view of three modules. Modules 200, 202 and 204 are attached together to form a "flying carpet". Interconnections between the modules allow electrical power and digital data to be exchanged between a module and each of its adjacent modules.

FIG. 2B is a perspective view of three modules that are flexibly interconnected. Modules 210, 212, 214 are flexibly connected to each other by mechanically flexible connections 216, 218, 220. In some implementations, connections 216, 218 and 220 are so flexible that they are not load-bearing. In FIG. 2, a sensor 230, 232, 234 is located on each cell. For example, these sensors may be cameras or radar resonators that form an array for synthetic aperture imaging or synthetic aperture radar, respectively. Also, in some implementations, cells in a flexible programmable surface (such as 210, 212, 214 in FIG. 2) may be used as a deformable array for transmitting and receiving signals, (e.g., radar, sonar, RF).

In the examples shown in FIGS. 2A and 2B, the interconnections allow modules to be easily attached and detached from each other. Advantageously, this permits "span on demand". On a mission-by-mission basis, the amount of modules may be varied, depending on the desired weight of the payload.

Each module in FIGS. 2A and 2B also includes a processor that performs distributed or spatial computing. The processor controls an electric motor that drives at least one propeller. The processor also outputs and receives electronic signals from adjacent modules. FIGS. 2A and 2B do not show some details of the modules, such as their motors, processors, power sources and interconnections with other modules.

Figure 3:
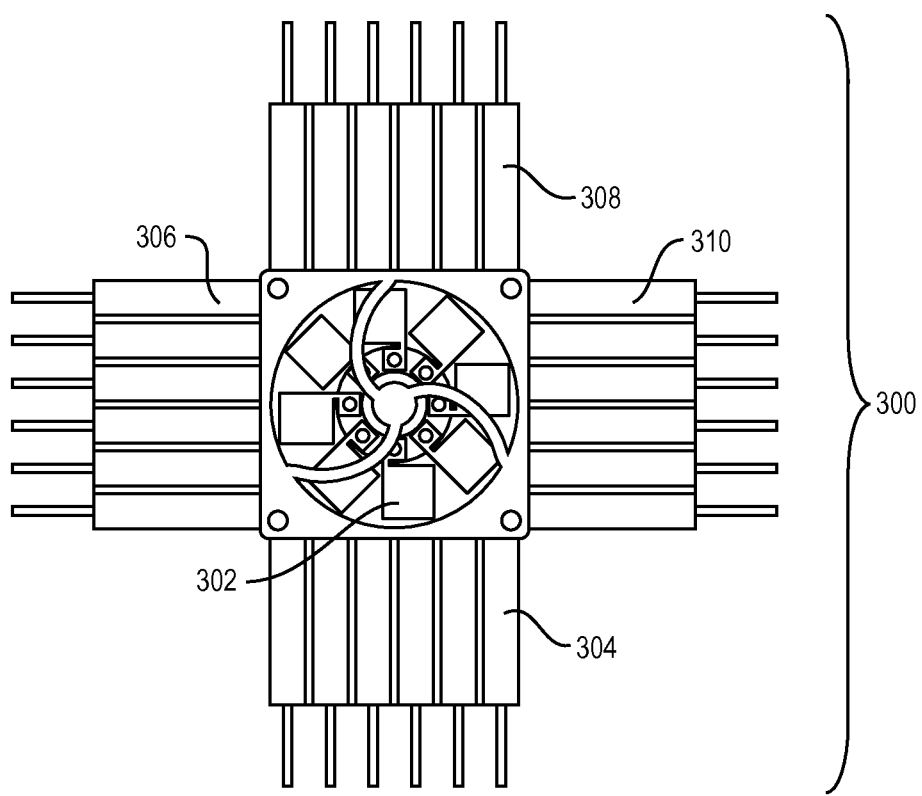
FIG. 3 shows an embodiment in which mechanical and electrical connections between cells are co-located.

FIG. 3 shows a cell, in which the mechanical and electrical connections with other cells are co-located. In this example, a cell 300 has propellers (such as propeller 302), and also has connections 304, 306, 308, 310 for connecting with four adjacent cells, respectively. These connections are mechanically rigid, permitting cells to be rigidly connected together. Each connection (e.g., 310) includes six pins, some for electrical power and some for communication.

Figure 4:
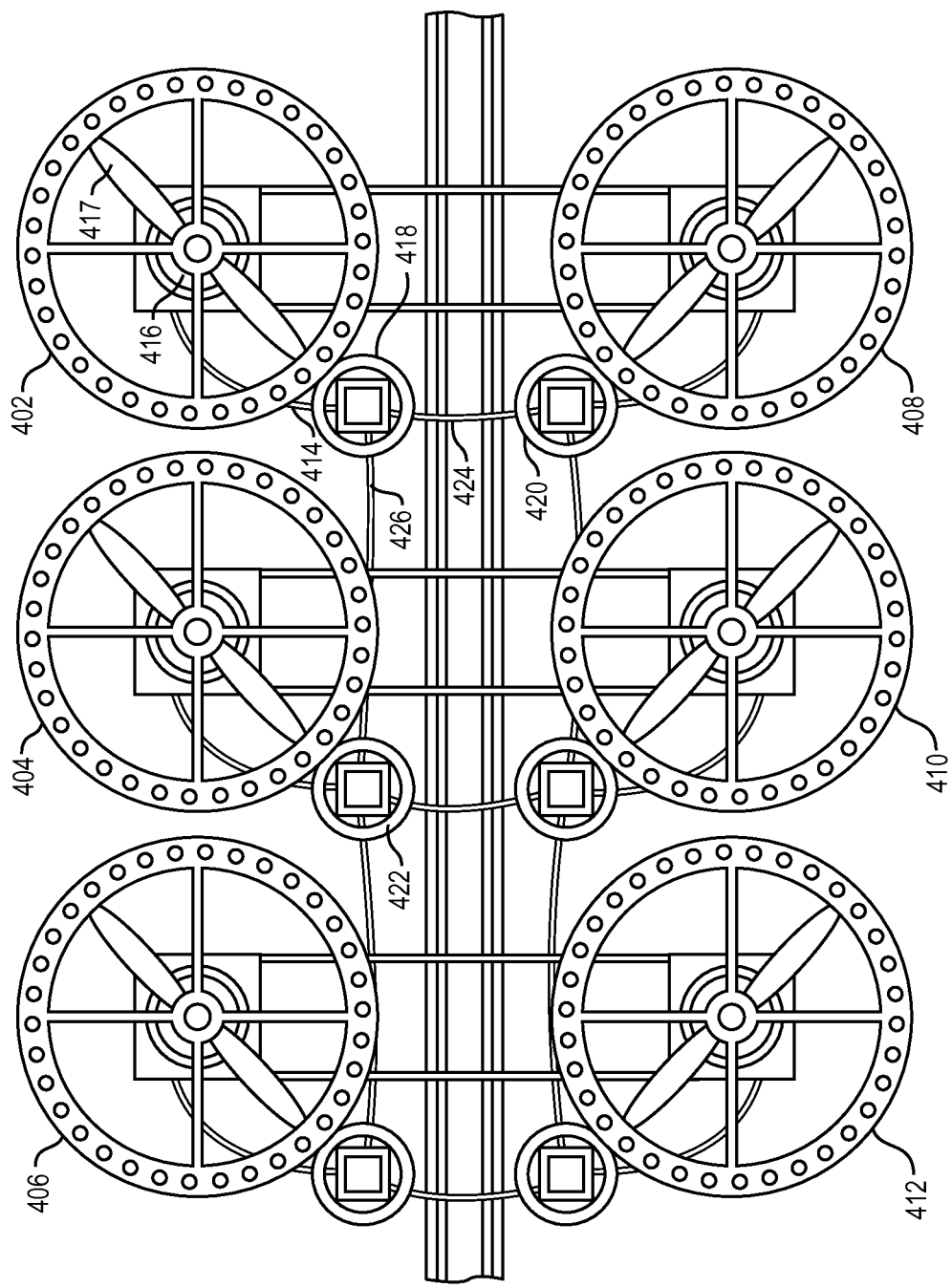
FIG. 4 is a top view of an array of six cells, in which each cell has a propeller.

FIG. 4 is a top view of an array of six cells 402, 404, 406, 408, 410. Each cell in this array has a propeller and a processor. Each of the processors can communicate electronically with its neighbors. For example, processor 418 can communicate with processor 424 and 426. Wiring (such as wiring 242, 426) provides a communication and power link between the cells in the array. Other wiring (such as 414) connects the processor of each cell with the motor of that cell.

Figure 5:
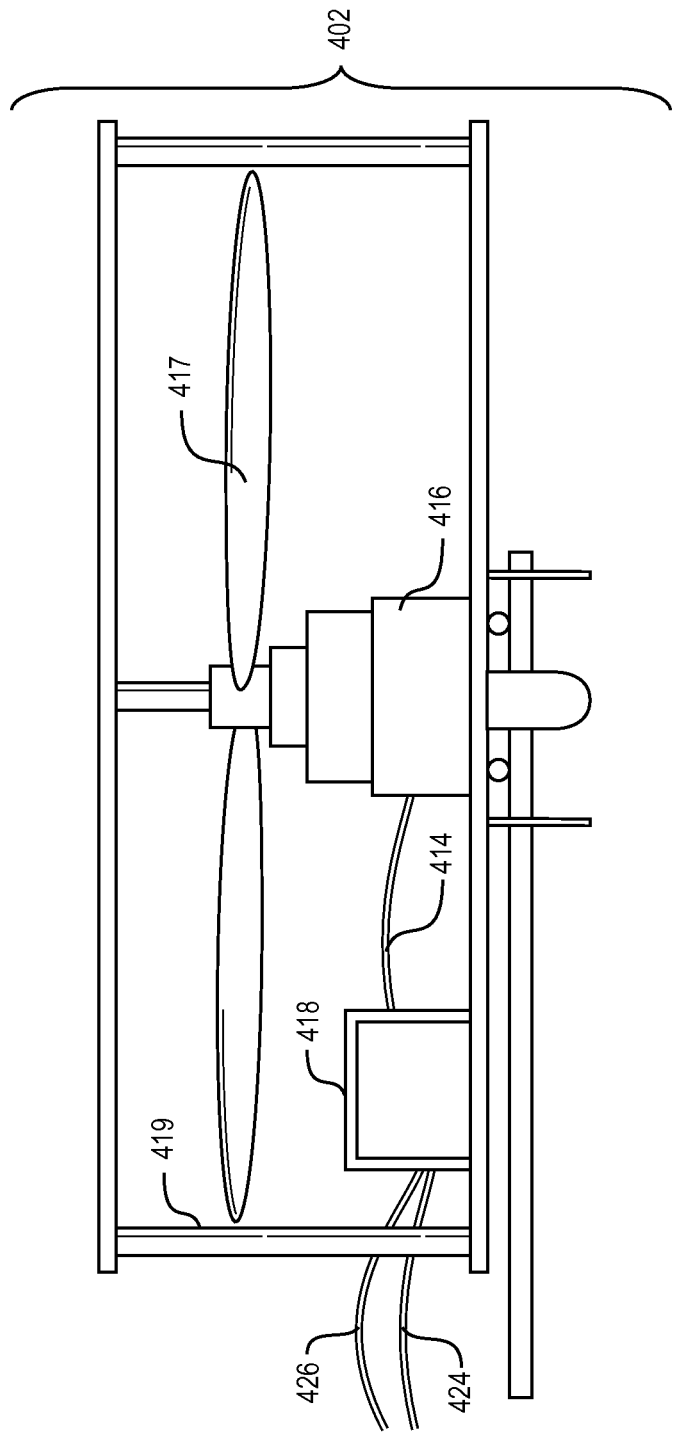
FIG. 5 is a side view of a cell in the array shown in FIG. 4.

FIG. 5 is a side view of a cell 402 in the array shown in FIG. 4. An electrical motor 416 actuates a propeller 417. Wiring 414 provides a communications link between a processor 418 and the motor 416. It also provides a power link . . . . The processor 418 performs computations locally, including to control the motor, to communicate with adjacent cells, to process data received from sensors onboard that cell or from adjacent cells, and to determine the state of that cell and its adjacent cells. Processing in the array of cells shown in FIG. 4 is distributed among the cells. The computations performed by processor 418 are part of that distributed computing. In the cell shown in FIG. 5, structural elements (e.g., 419) provide support.

In FIGS. 1, 2, 3, 4 and 5, each cell in the programmable surface generates thrust that is substantially normal to the programmable surface's local orientation.

Figure 6:
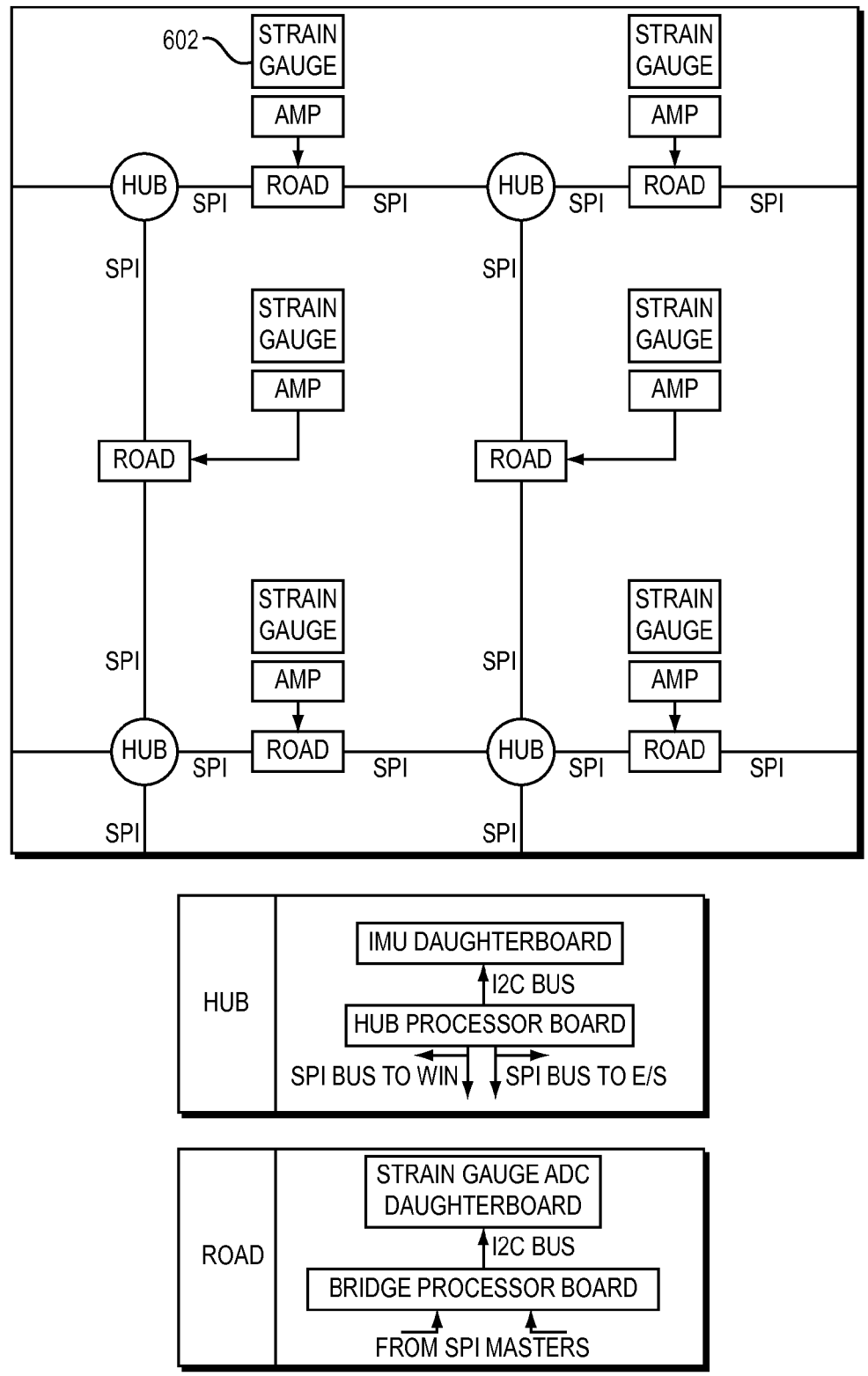
FIG. 6 is a schematic of a road/hub architecture that may be employed.

FIG. 6 is a schematic of a road/hub architecture employed for distributed computing in an illustrative embodiment of this invention. Data gathered from strain gauges (e.g., 602) is used to determine displacement of one cell relative to an adjacent cell and to determine state. For example, suppose the propellers in cells 402 and 404 are both off, and then the propeller in cell 404 is turned on. This will cause a displacement of cell 404 relative to cell 402 that can be detected by a strain gauge. This displacement data may, for example, be used by processor 418 in cell 402 to detect whether there is a discrepancy between the state data communicated by cell 404 (e.g. my propeller is on) and the data gathered by the strain sensors.

Figure 7:
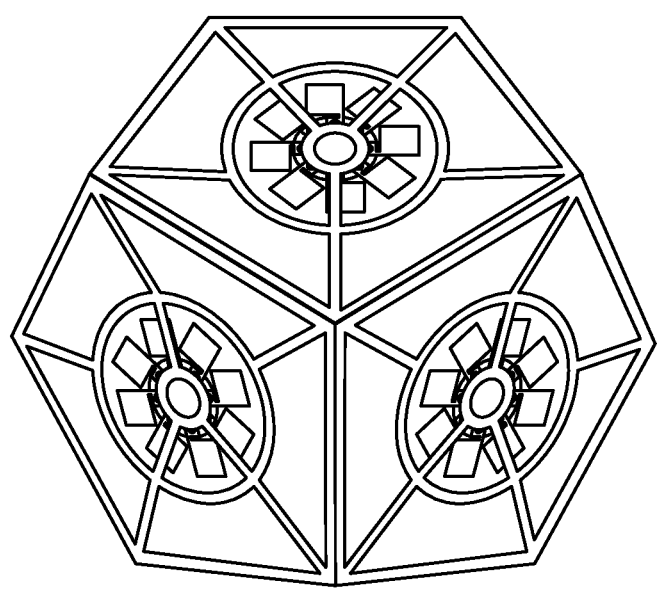
FIG. 7 is a perspective view of a "flying sphere".

FIG. 7 is a perspective view of an aircraft that comprises a "flying sphere". The aircraft is in the shape of a polyhedron. The exterior of the polyhedron comprises a programmable surface comprising many cells. In the example shown in FIG. 7, each side of the polyhedron has one cell with one propeller in it. Alternately, each side of the polyhedron may comprise many cells and include many thrust generators. FIG. 7 shows a polyhedron with a sufficiently large number of sides that it approximates the shape of a sphere. However, the number of sides of the polyhedron may vary, depending on the implementation, but in any event the polyhedron has at least four sides. The structural elements of the polyhedron comprise high strength, light weight, composite materials. The "flying sphere" primarily comprises empty space through which air may flow.

In the examples shown in FIGS. 1-6 and 8, the normal thrust generated by the programmable surface can be employed directly to provide lift. Furthermore, the normal thrust can be used to control the direction of motion and angular orientation of the aircraft, by varying the relative amount of thrust outputted by the respective modules at a given time. Any combination of roll, pitch and yaw may be achieved in this manner.

In some implementations, cells are grouped into modules, and detachable interconnections exist only between modules, not between cells. Each module may contain one or more cells. Some functions may be distributed on a cell-by-cell basis, and others distributed on a module-by-module basis. In some embodiments of this invention, a single cell or a single module may contain multiple thrust generators (such as propellers).

In exemplary embodiments of this invention, certain functions may be distributed only to a limited extent (e.g., only in some cells) or may be centralized. For example, it may be advantageous to centralize power or fuel storage, and to centralize inertial measurement by using only one set of accelerometers, gyroscopes or other inertial measurement units.

In exemplary embodiments, the net thrust vector may be pointed in any 3D direction relative to the craft's inertial frame of reference, by varying the relative amount of thrust generated by different cells in the array. This allows transport to occur in any arbitrary direction.

A programmable surface with many little cells may generate a large amount of thrust, because the cells may accelerate a large mass of air per unit of time.

By tilting the programmable surface (e.g. by 3 or 4 degrees), the net thrust vector may include a component pointed in the direction of travel, and thus the normal thrust may be used for propulsion.

Figure 17A:
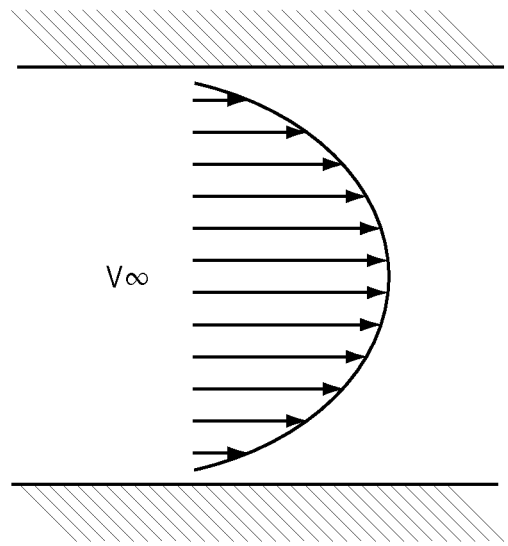
FIG. 17A shows a velocity gradient in a conventional pipe.
Figure 17B:
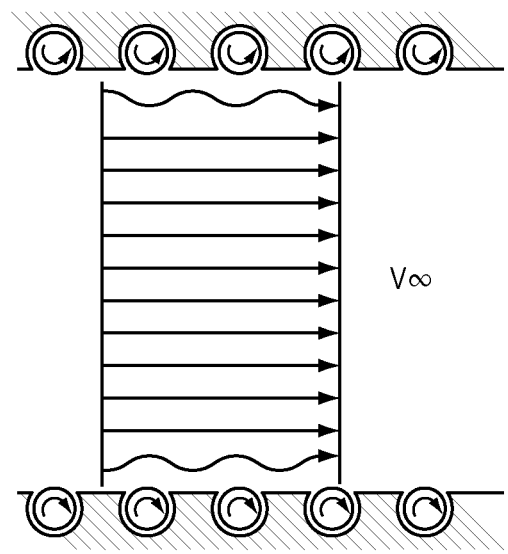
FIG. 17B is a diagram that shows cells being used to alter a velocity gradient in a pipe.

The following description, up to and including the description of FIG. 17, discloses exemplary embodiments of this invention in which cells generate shear thrust (whereas much of the description above involved cells that generate normal thrust).

In exemplary implementations discussed below, a programmable surface covers all or part of a craft, such as the surface of an aircraft or the wetted surface of a marine vessel. The surface is comprised of many little cells, each of which can perform computations, communicate with adjacent cells, and generate shear thrust.

In these exemplary implementations involving shear thrust, cells may be used to reduce viscous drag (i.e., skin drag and form drag). The cells achieve these results by controlling the speed and thickness of the boundary layer between a solid and a moving fluid.

For example, in order to reduce skin drag and form drag, the cells may manipulate the velocity of the solid wall at any point. By reducing the difference between free stream and surface velocities, a new velocity profile is created in the boundary layer, and skin drag and form drag are reduced. For example, the cells may be used to alter the surface velocity so that it matches the fluid stream velocity.

In these exemplary implementations involving shear thrust, the cells may be used to dynamically control the surface velocity at any given surface patch. The solid surface is divided into a multiplicity of small cells. Each cell interacts with a small region of fluid nearest its surface. Actively powered effectors on the cell surfaces interact with the fluid and change the interface conditions between fluid and solid object. Cells are individually addressable and controllable so that each can have a different velocity at its surface. The combined effect of cells working together is to alter the apparent stream lines of a fluid flowing about the solid object.

In exemplary implementations, cells in an array may generate shear thrust that is used for propulsion, or to control the direction of a vessel.

In some embodiments of this invention, the spinning rotors comprise the fluid coupling means that generate shear thrust. Alternately, other fluid coupling shapes may be used to generate shear thrust. For example, the fluid interface may be a spinning disk, a membrane whose shape may be altered, a moving belt, cilia, a flipper or paddle, or a propeller. In exemplary implementations of this invention, regardless of the coupling shape, the net result is to allow an arbitrary wall velocity to be set at a small patch on a programmable surface.

In these exemplary implementations, cells may operate in either an "input" or "output" mode. In the "output" mode, energy is applied to a cell which causes the surface to move in a velocity and direction. In the "input" mode, each cell's surface is driven by the flow velocity through frictional skin drag and the movement of the surface is converted into energy. In some implementations, cells are dual purpose, and may operate in both output and input mode. In other implementations, at least some of the cells are specialized, so that some operate only in the output mode and some operate in input mode. The input and output versions may intersect in transducers which work in both modes such as an electric DC motor.

In some embodiments of this invention, cells use conventionally fabricated miniature electromagnetic motors to convert input electrical power to mechanical motion or vice versa. Cells may also use piezoelectric coupling to convert small mechanical motions to electrical energy.

In an illustrative embodiment of this invention, a cell that can generate shear force comprises a roller mechanically coupled to an electromagnetic motor. Small permanent magnet DC motors are used for the motive force to generate work through the boundary layer attachment with the surrounding fluid. The motors are electrically powered by an external power plant within the vessel.

In exemplary implementations, cells are arranged side-by-side in arrays. These cells are connected to each other in several xed onboard computation units. Alternately, the computation units may be external to the surface. For example, some computation may be performed by an external computer.

In exemplary implementations of this invention, the input mode may be used to generate energy. For example, stream beds, sides of buildings, and the insides of tunnels may be covered with cells. These cells may operate in input mode to capture energy from the fluid moving past the surface.

According to principles of this invention, energy may be captured from a moving fluid in such a way that the fluid flow remains laminar. This is highly advantageous, since it would allow the cells to be stacked, unlike conventional wind turbines which cannot be practically stacked. After air passes through a conventional wind turbine, it is highly turbulent, and thus it is not practical to put a second wind turbine right behind the first wind turbine. In contrast, this invention may be implemented so that after air passes over a cell operating in input mode, the air remains in laminar flow.

It can be difficult to use computational models to determine the speed of the boundary layer in particular parts of the surface. This is a problem, because in order to decide how rapidly to operate cells in output mode, one wants to know how much of a velocity difference exits between the surface and the free stream.

To solve this problem, in exemplary implementations of this invention, cells operating in input mode are interspersed with cells operating in output mode. This cells operating in input mode may determine the local speed of the boundary layer. For example, this speed may be inferred from the rate at which energy is captured by the cell.

This invention may be implemented in such a way that cells cover the inner wetted surface of a pipe. The cells may be used to assist in moving fluid through a pipe—i.e., to propel the fluid. The cells may also be used to reduce the difference between the velocity of the pipe wall and the fluid, causing the flow to be more laminar, thereby reducing the energy required to pump the fluid.

Figure 8:
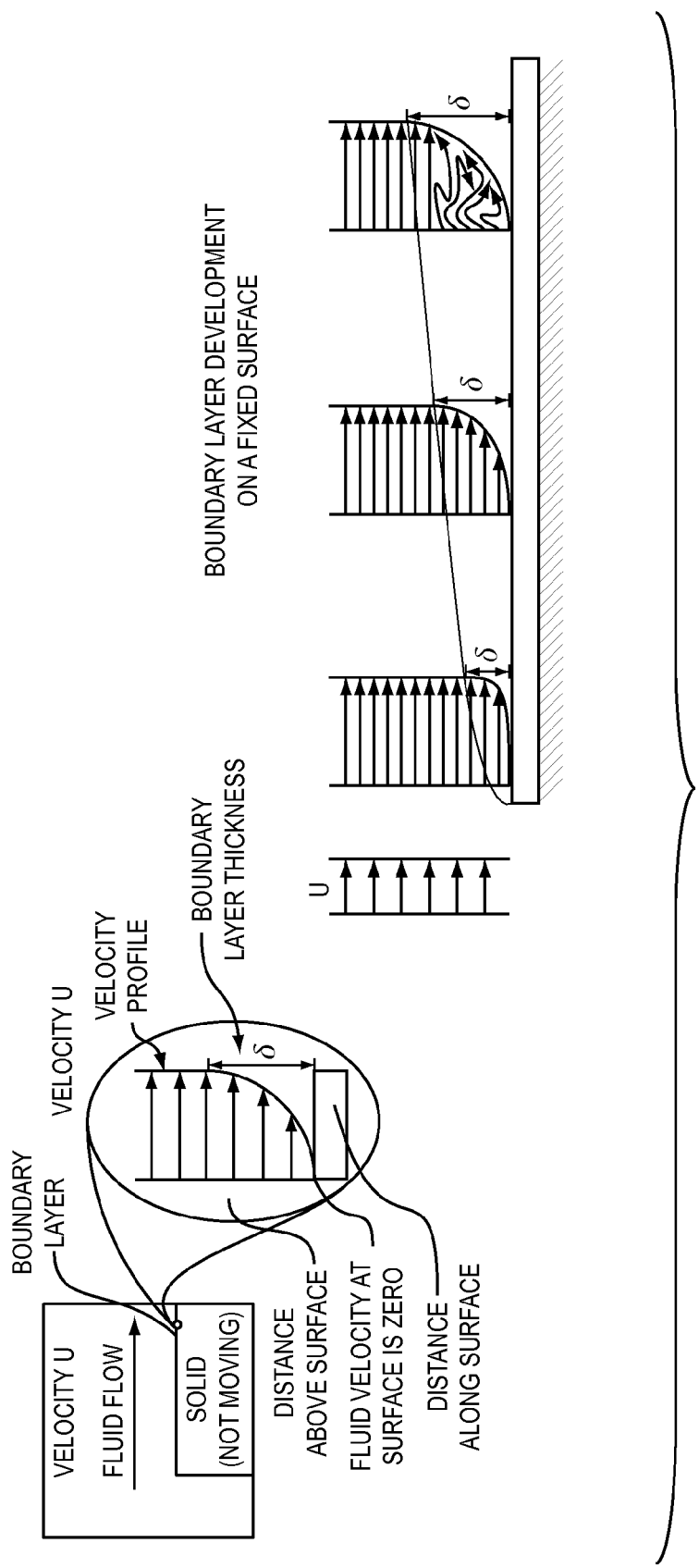
FIG. 8 is a diagram showing turbulence developing in a boundary layer.

FIG. 8 is a diagram that shows a boundary layer. As a craft (such as an aircraft or marine vessel) moves through a fluid (such as air or water), a boundary layer develops. In that boundary layer, there is a velocity gradient. At the surface of the craft, the fluid is static relative to the surface. As distance from the surface increases, the difference in velocity between the craft and vessel increases, until it reaches a maximum at the other side of the boundary layer. As shown in FIG. 8, turbulence may develop in the boundary layer, due to the difference in velocity between the fluid and the surface.

Figure 9C:
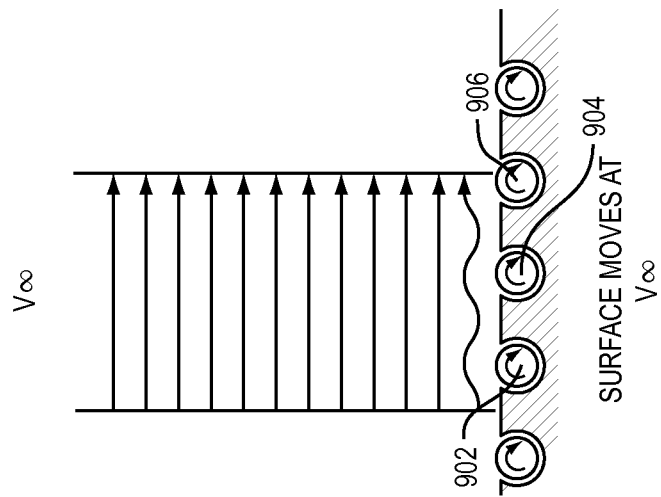
FIG. 9C shows rollers altering a velocity gradient.
Figure 9B:
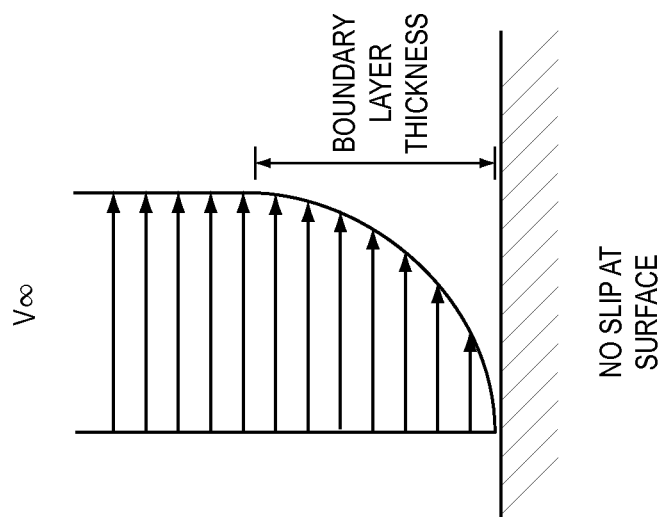
FIG. 9B shows a velocity gradient of a viscous stream moving past a conventional surface.
Figure 9A:
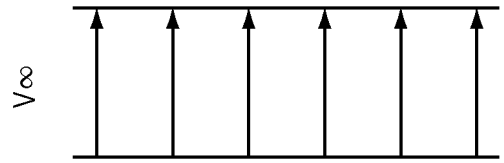
FIG. 9A shows a velocity gradient of viscous flow in a free stream.

FIG. 9A shows a fully developed viscous flow in a free stream. In that case, all of the layers of the stream are moving at the same speed. FIG. 9B shows a viscous stream moving past a conventional surface. In that case, the velocity of the stream near the surface rapidly changes from zero (where the fluid is in contact with the surface) to the full speed of the free stream. FIG. 9C shows how the surface velocity of the object may be altered so that it matches the free stream flow, in an exemplary implementation of this invention. In this example, rollers (such as 902, 904, 906) change the speed of the surface. This changes the velocity profile and reduces turbulence.

The ability to alter the surface velocity is highly advantageous, because it may be used to reduce viscous drag. As drag is reduced, it takes less energy to move a vessel through a fluid. Viscous drag is comprised of form and friction drag.

In exemplary implementations of this invention, the surfaces are physically moved to match the free stream velocity of the fluid creating a slip boundary wall at the interface with the fluid, reducing or eliminating friction drag. In these implementations, cells are actively powered so that the speed at the surface of the object, u, is faster than the speed of the center of mass of the object. Friction drag is greatly reduced by bringing u close to U so that the squared term is minimized.

According to principles of this invention, body drag (also known as form drag) may be reduced by manipulating the boundary layer in such a way that the flow over the object emulates the flow over a more aerodynamic shape.

Body or form drag results from the pressure difference between the streamwise front and back regions of fluid near the object. The geometric shape of the front of the body can be designed to more or less aerodynamic, that is, to cause the fluid stream to change more or less radically in direction. A more aerodynamic or streamlined shape will result in less pressure, however, the region at the front of the body will have greater pressure than the free stream. In the lee of the object is a fluid region of lower pressure. If the flow around the object remains laminar and converges gently, the pressure difference is smaller. Thus, an ideal passive geometry is a rounded one with minimal cross sectional area which gradually diverts the flow at the front, encourages laminar adhesion down the length of the object, and gradually brings the flow back together behind the object so that the streamlines are continuous. Shapes of this type are commonly called teardrops. At high speeds, body drag dominates the total viscous drag resistance.

While teardrop shapes are aerodynamic, their shape is not ideal to fill with payload such as shipping containers. According to principles of this invention, independently actively driven cells on a surface can form and aggregate boundary layer patterns in such a way that the vessel body appears to the fluid to be a different geometry. In other words, by manipulating the boundary layer, a synthetic shape is created that emulates a more aerodynamic shape. This approach is not limited to aircraft, but may be used to create a synthetic shape that is more hydrodynamically efficient.

In exemplary implementations of this invention, cells use conventionally fabricated miniature electromagnetic motors to convert input electrical power to mechanical motion or vice versa. Cells may also use piezoelectric coupling to convert small mechanical motions to electrical energy.

In some embodiments, a cell has at least one spinning drum (or roller) as the fluid interface. The rotation of the spinning drum (or roller) is transmitted to the motor shaft mechanically by gears or pulleys, magnetically, or other conventional means.

Figure 10:
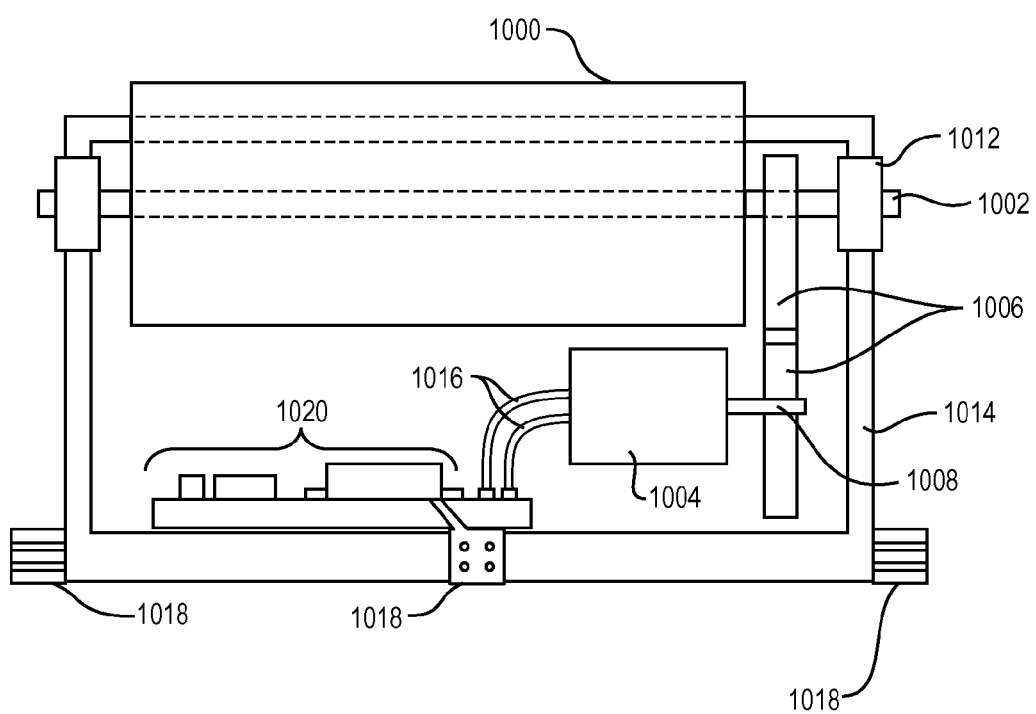
FIG. 10 is a diagram of a cell which generates shear thrust with rollers.

FIG. 10 is a diagram of a cell which generates shear thrust with rollers. In the example shown in FIG. 10, a roller 1000 rotates around a shaft 1002. Both are made from a solid rigid material. The material is a rigid material that is suitable for the fluid medium in which it will run (e.g., brass or plastic for water) but is not ferro-magnetic (so as not to interfere with the DC motor 1004 used in this implementation).

On one end of the roller-shaft combination is a gear 1006 which has been pressed on and may be secured with conventional machining processes such as a key, set screw, or adhesives. A pinion gear of matching pitch is attached to the shaft 1008 of the motor 1004. Rotating torque from the motor is transmitted from the motor shaft to the roller via the gear combination. Both ends of the roller shaft are supported by bearings 1012, which are pressed in to the mechanical housing 1014 of the cell.

The roller 1000 and shaft 1002 may be made in a variety of ways. For example, they may be turned using conventional lathe machining, or may instead be 3D fabricated in an additive fashion. Alternately, the shaft may be a separate piece that is inserted longitudinally into a hollow roller.

The roller 1000 may have a smooth surface so that there are only frictional adhesion forces with the fluid which induce less turbulence in the fluid. Alternately, it may have features such as grooves, ridges, divots or bumps. These may be used to advantage for impingement interaction with the fluid when the cells are used for energy capture. The features may be arranged to maximally interface with the fluid medium.

A processor 1020 may perform computations, including to control the motor 1004, to communicate with adjacent cells, to process data received from sensors onboard that cell or from adjacent cells, and to determine the state of that cell and its adjacent cells.

Cell-to-cell power and communications interconnects 1018 allow power to be distributed among the cells and allow electronic communication between adjacent cells. Wiring 1016 allows provides a communications and power link with the motor 1004.

Figure 11:
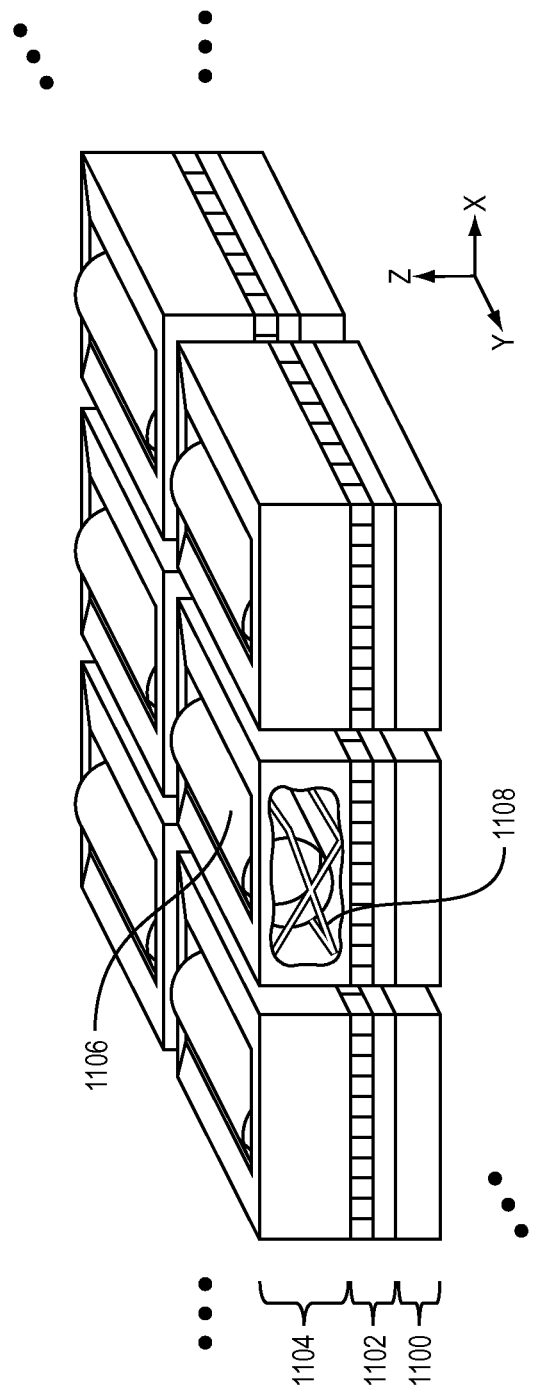
FIG. 11 is a diagram of an array of six cells that generate shear thrust with rollers.

FIG. 11 is a diagram of an array of cells that generate shear thrust with rollers. The array comprises four sub-systems: first, mechanical alignment and inter-cell power and communications 1100; second, logic and computation 1102; fluid interface 1104, and mechanical housing (not shown). These four subsystems may be manufactured separately as layers which are later assembled. The entire cell may be made using semi-conductor and MEMS wafer fabrication processes or a hybrid of standard and micro-machining processes with assembly of component pieces afterwards. A reel-to-reel process or layer self-alignment may also be used for assembly.

The fluid interface subsystem 1104 may include turbine rotors (e.g. 1106) with wire windings (e.g., 1108).

In other embodiments, shear thrust is generated by a spinning disk under a cover plate. In this case, a window in the cover exposes a portion of the spinning disk to the nearby fluid. For example, the window may expose a portion of the spinning disk that is moving parallel with, and in the same direction as, the fluid flow.

A spinning disk is well suited for situations in which it is desirable for the axis of rotation to be normal to the surface.

In an exemplary implementation of the invention, the spinning disk approach is implemented in such a way that a cell has a cover plate in which a cut-through window reveals a patch of a spinning disk such that the area revealed is nominally parallel to the flow. The flat disk has a bearing pressed into the center and gear teeth which mesh with a motor. The motor may be oriented such that the shaft is perpendicular to the axis of rotation of the disk. Conventionally machined spur or helical gears may be stacked below the disk on the same shaft. Alternately, internal or external gear teeth can be machined directly on the disk. A pinion gear may be attached to the motor shaft in conventional means such as a key, set screw, or adhesives. Disk and cover materials may be rigid and can be chosen as appropriate for the fluid medium in which they are to operate.

Figure 12:
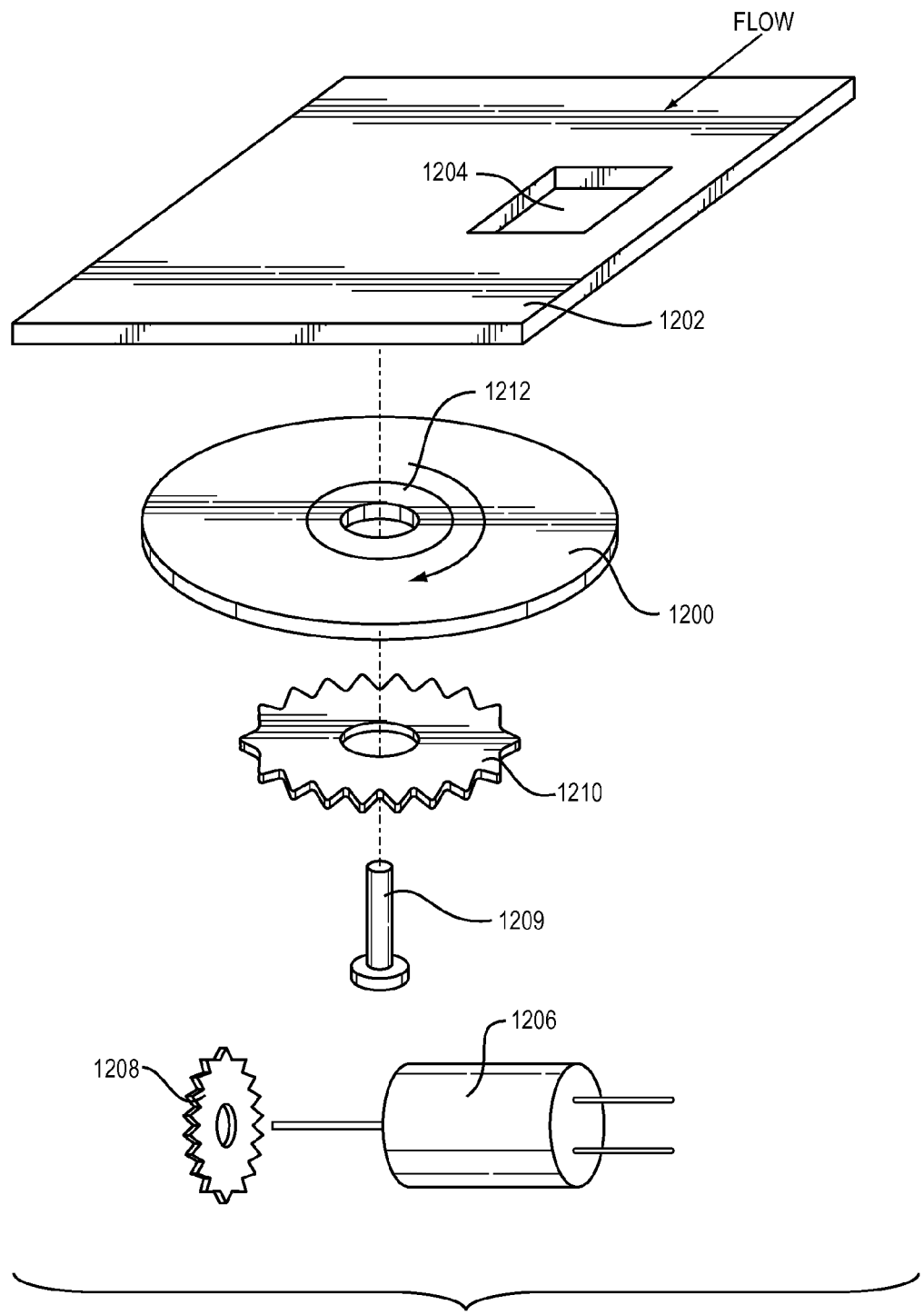
FIG. 12 is a diagram that shows how a spinning disk aligned parallel to may be used to generate shear thrust.

FIG. 12 is a diagram that shows a spinning disk for generating shear thrust. A flat spinning disk 1200 is oriented such that the axis of rotation is normal to the surface where a cover plate 1202 is installed. A window 1204 in the cover plate exposes a small area of the spinning disk 1200 to the fluid. Torque from a motor 1206 is mechanically transmitted to the disk 1200 by pinion gear 1208, a shaft 1209, and sprocket 1210. A bearing 1212 is placed between the disk and the shaft.

Alternately, shear thrust may be generated by a cavity covered with a membrane. In an illustrative embodiment of this invention, the internal pressure of the cavity can be controlled thermally to deflect the membrane; the thermocouple is controlled electrically. Alternatively the membrane can be mechanically moved with small actuators within the cavity. The resulting effect is to impart energy into the fluid in the direction normal to the surface. Aggregate effects of multiple different energy impulses sum to net forces in arbitrary directions and magnitudes (constrained to the directions "above" the surface). This approach can be used for energy recovery in fluids with high frequency turbulence or as distributed pressure sensors.

Alternately, shear thrust may be generated by cilia-like (hair-like) effectors. In an illustrative embodiment of this invention, these cilia may be constructed by creating small strips that are singly supported at the surface of the cell. The bases of the strips are attached with piezoelectric hinges. When the flow causes the strips to flap or flutter, electricity is generated in the piezoelectric material. Alternatively the strips can be attached to the cell structure using bimetallic hinges which flex when electrified. Pulsing the hinges results in a flapping or waving motion of the strips.

In addition, the fluid interface that generates shear thrust may be shaped in other ways, such as small propellers or small flippers or paddles.

In an exemplary implementation of this invention, cell-to-cell assembly alignment uses mechanical features on the housing for kinematic coupling. This coupling positions each cell correctly with respect to adjoining cells. The mechanical housing forms a backbone substrate for the cell array surface. It may also carry some of the power or data between cells.

In this example, the housing is manufactured using conventional micro machining processes and the motor, circuitry, and drum are snap-pressed in during cell assembly. The housing may also be manufactured at the same time as the other parts if a semiconductor and MEMS process is used.

The total number of cells on the surface of a craft may be quite large. This can make it difficult to use a centralized sensor acquisition, processing, and command approach. Another problem is that the propagation of a system clock would be highly susceptible to problems due to fan out.

To solve these problems, a decentralized computing approach may be used. A decentralized approach is well-suited in this context: Because of the continuity of a viscous medium, a cell on a surface only needs to be aware of the dynamic situation immediately local to itself, at least for some purposes. Cells may be connected only to their nearest neighbors but use a "hop count" to determine the distance from which information has come. Moreover, cells may be interconnected asynchronously by exchanging tokens.

In an illustrative embodiment of the invention, inter-cell connections serve two purposes, to distribute power and ground, and to pass messages among the cells. In this embodiment, the array of cells is the communications medium itself, that is, a cell may receive a message from a neighbor to be passed on to another neighbor or the message may be for itself.

In this illustrative embodiment, cells are internally unique and can discover their location and orientation among themselves after manufacturing and installation. The cells are not expected to be reconfigured after placement so a discovery program can map the entire surface by having each neighbor samples its neighbors, tracking the number of hops and direction. Because the fluid medium is continuous, individual cells may be concerned only with the cells within some radius of itself and can disregard messages with hop counts greater than some value. Messages can also be coded to be for all cells.

Figure 13:
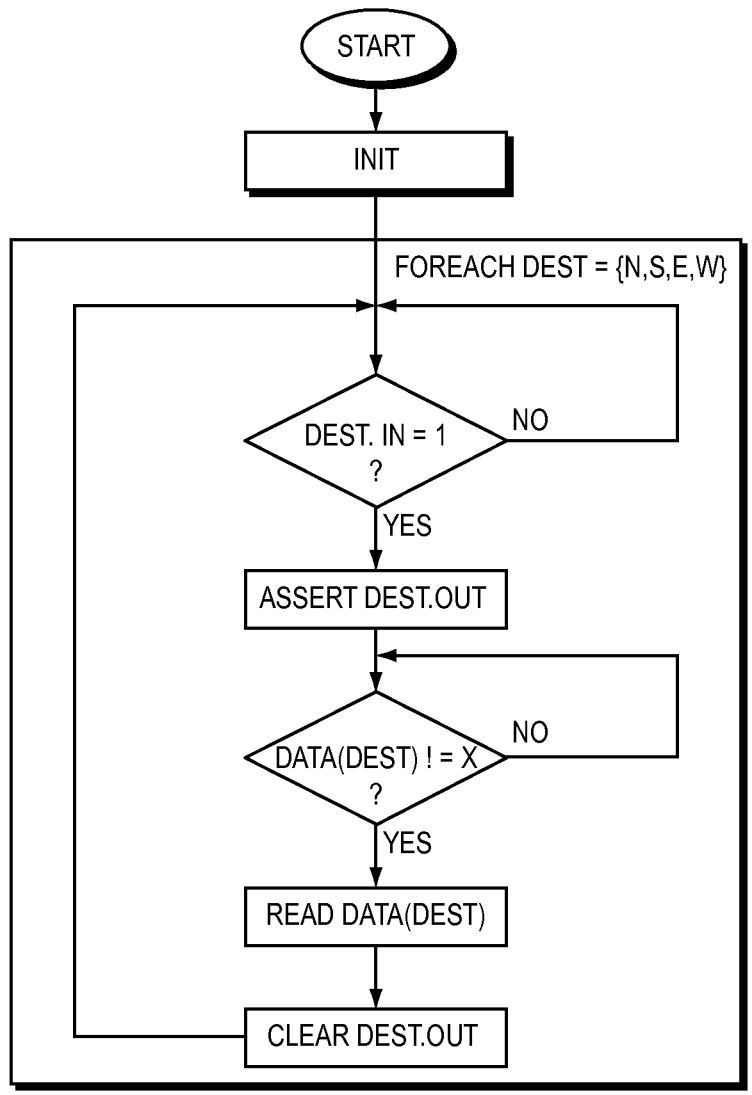
FIG. 13 is a flow chart that shows an asynchronous, token-based serial communication protocol among cells.
Figure 14A:
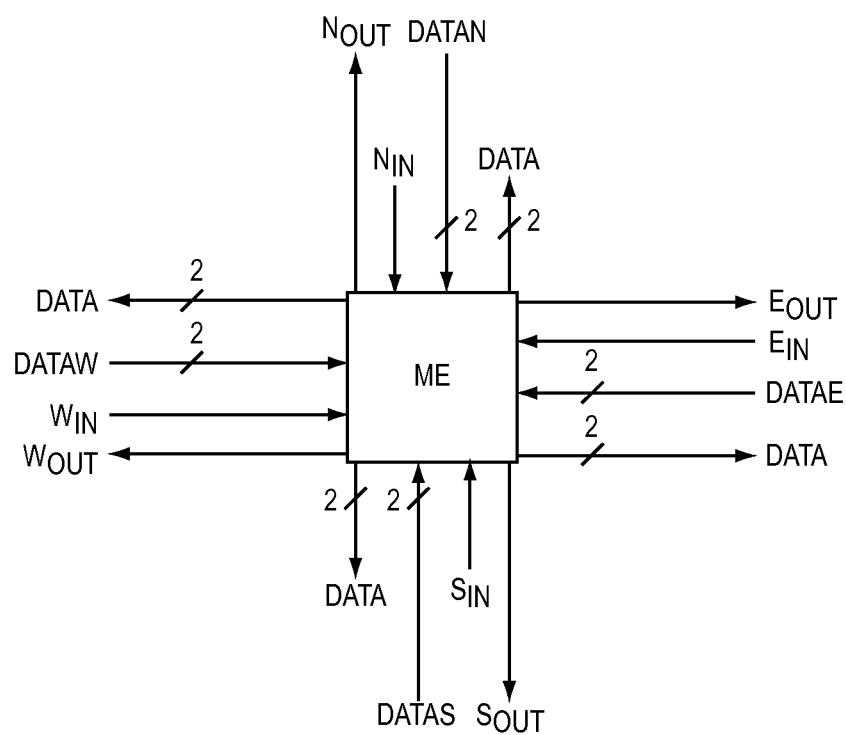
FIG. 14A shows inputs and outputs.
Figure 14B:
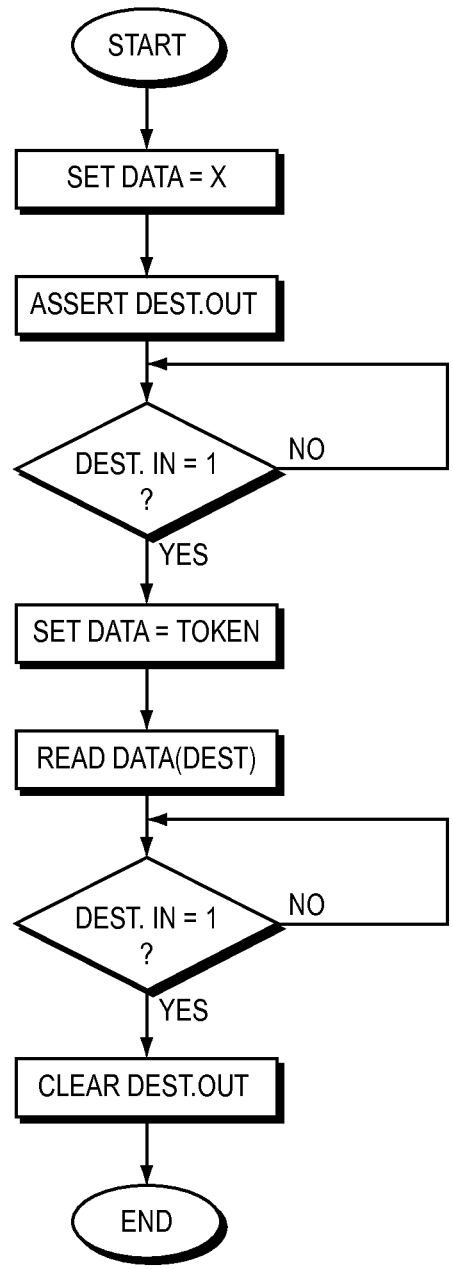
FIG. 14B is a flow chart that also depicts an asynchronous, token-based serial communication protocol among cells.
Figure 15B:
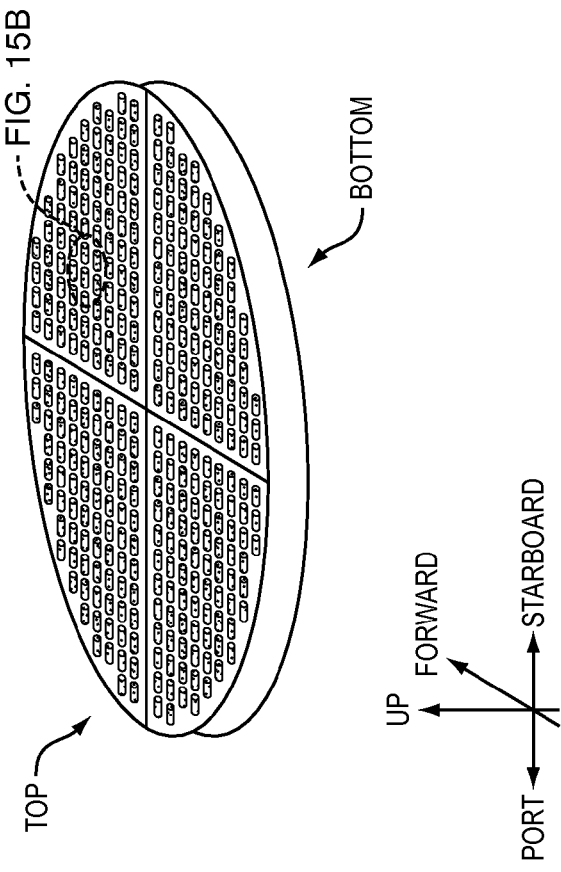
FIG. 15B is an expanded view of a portion of that surface.
Figure 15A:
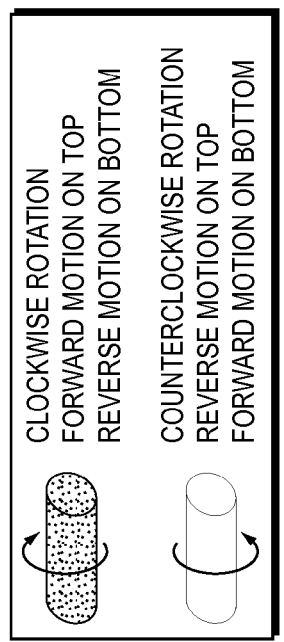
FIG. 15A is a diagram that depicts the rotation of rollers on a surface.

FIGS. 13, 14A and 14B depict an asynchronous, token-based serial communication protocol among cells, in an exemplary embodiment of this invention.

As shown in the flowcharts in FIGS. 13 and 14B, each cell has a dedicated destination address line to each of its neighbors. In a square topology, each cell has a North, East, South, and West neighbor so there are four outgoing destination address lines (denoted DEST.out where DEST can be north, east, south, or west). The cell has a corresponding incoming line from each of these cells, denoted DEST.in. In this example, communications are serial. In order to minimize I/O pins, the DATA is broadcast to all the neighbors. There are corresponding incoming DATA lines from each of the neighbors which are denoted DATA_DEST. The DEST lines are used to indicate which neighbor the token was meant for, and used in a handshaking protocol to indicate when a token has been received.

In the algorithms depicted in these flow charts, when a cell is not otherwise busy with internal computation, the cell returns to a wait loop polling each of the incoming destination lines. When it sees one of the lines go high, the corresponding neighbor has a message. To indicate that it is ready to receive, the cell asserts the outgoing DEST for the same neighbor then begins to poll the DATA_DEST lines. When the neighbor cell sees that this cell has acknowledged the request, it changes its DATA lines (DATA_DEST from the perspective of this cell) from "X" to a valid message. The cell records the message and clears the DEST.out line which signals the neighbor to clear it's corresponding address line (DEST.in from the perspective of this cell). This is a non-blocking asynchronous scheme that is triggered by the availability of a token so that each cell can run at its own clock speed.

Different topologies are possible by scaling the DEST lines. Parallel communications are possible by increasing DATA width.

In exemplary implementations of this invention, all cells are addressable and the number of cells is easily scalable. A variety of topologies and computing approaches may be used.

In exemplary implementations of this invention, a cell can operate in both the output mode and an input mode. For example, this can be achieved with a reversible transducer which converts from mechanical energy to electrical energy and vice versa. An example is a cell which has a roller coupled to a permanent magnet motor. In output mode, when the surface interacting with the fluid is actively moved to impart momentum transfer from the solid to the fluid, electrical power is applied to the electromechanical motor which spins the roller directly coupled to it. The roller surface adheres to the fluid closest to it and drags it along in the direction of motion of the roller. To use the same cell as an input, where energy is created from the motion of the fluid relative to the surface, the rollers are not driven but allowed to be dragged along by the flow. The fluid adheres to the roller surface based on viscosity and velocity. The rolling roller drives the shaft of the electromagnetic motor creating electrical energy at its terminals.

This invention may be implemented in such a way that cells may be used to control the direction of motion of a vessel. Controllability of a vessel is affected by the thrust to weight ratio as well as by the percentage of flight surfaces that are control surfaces.

Conventional control surfaces change the profile of the aerodynamic wing or rudders by physically deforming, moving, or changing the geometry. If payload aiming is involved, a stand-along pointing system is often employed to make course path solutions simpler.

According to principles of this invention, the surface of a vessel may instead be covered with individually controllable cells that allow for fine-grained complex flows surrounding the vessel. In this approach, the entire external surface may be involved in small manipulations of the fluid flow and pressures immediately adjacent to the walls. A full range of bulk control motions can be accomplished by driving cells independently, as show in FIGS. 15, 16A, 16B and 16C. In the example shown in FIG. 16A, the ergo rotors are spinning clockwise on the top side and counterclockwise on the bottom side, causing lateral displacement of the device. In the example shown in FIG. 16B, the rotors on both the top side and bottom side are both spinning counterclockwise, causing the device to rotate (flipping it over). In the example shown in FIG. 16C, the rotors on the right half of the top side and left half of the bottom side are spinning clockwise and the rotors on the left half of the top side and right half of the bottom side are spinning counterclockwise, causing a different rotation of the device (spinning it around). Additionally, by mismatching "top" and "bottom" surface velocities in the presence of fluid flow, a net lifting force is generated which can be used for additional non-traditional controls.

Embodiments of this invention in which cells generate shear thrust have many applications. For example, in "output" configuration, applications involving boundary layer manipulation include vessel propulsion, drag reduction, steering control, acoustical stealth, and synthetic profiles. In "input" configuration, applications include energy generation from low head water bodies, stacked arrays of wind turbines, or sides of buildings and regenerative energy recovery from vessel braking Hybrids surfaces may be constructed to serve both modes.

According to principles of this invention, the entire wetted surface of an air or ocean going vessel can be employed for propulsion by covering the surface with cells operating in "output" mode. The vessel would have increased propulsive efficiency due to increased surface area for momentum transfer. Each cell is actively driven by the application of external energy, moving the cell wall at a desired speed and direction. The wall motion couples to a thin boundary layer of fluid and momentum transfer across the boundary layers results in aggregate motion of the vessel through the fluid. Efficiency gains over conventional propulsion are particularly good for very large vessels because momentum transfer through the boundary layer scales directly as surface area increases.

Because $E \sim mv^2$ while $$F \sim \frac{d}{dt} mv,$$

greater mass flows at slower speeds results in more power returns than smaller mass flows at faster speeds which is the case for conventional propulsion owing to the relatively small frontal area of the engine or propeller intake.

This invention may be implemented in such a way as to achieve acoustical stealth. Noise arises in part from fluctuations in fluid pressure which radiate outward from the vessel. As the speed of the craft increases so does the amplitude of the wave created by the induced turbulence at the leading edge, along the body, and in the wake of the craft. In an exemplary implementation of this invention, this problem is mitigated as follows: Cells covering the surface of the vessel are actively driven to match the velocity and direction of the fluid flow, thereby reducing or eliminating these sources of drag and turbulence. Also, cells used for propulsion may operate "along" the flow rather than "across" it, and therefore not perturb the fluid as much as engines or propellers, leading to quieter vessels.

In exemplary implementations of this invention, energy may be captured as a vessel slows. This form of hybrid braking employs cells distributed on a surface to convert fluid flow across the surface to stored energy. This stored energy may be used later when the vessel is underway. The storage can be done in the cell in a small capacitive buffer or transported through the array to larger storage such as a battery.

In low head hydro or non-ideal wind turbine applications, a lattice of cells which the fluid flows past allows each cell to independently match the conditions local to each patch. Coupled energy is converted to electrical energy which is passed through the lattice to storage. Unlike conventional turbines, large non-uniform areas can be covered, such as stream beds, sides of buildings, and the insides of tunnels.

According to principles of this invention, energy may be captured from a moving fluid in such a way that the fluid flow remains laminar. This is highly advantageous, since it would allow the cells to be stacked, unlike conventional wind turbines. After air passes through a conventional wind turbine, it is highly turbulent, and thus it is not practical to put a second wind turbine right behind the first wind turbine. In contrast, this invention may be implemented so that after air passes over a cell operating in input mode, the air remains in laminar flow.

It can be difficult to use computational models to determine the speed of the boundary layer in particular parts of the surface. This is a problem, because in order to decide how rapidly to operate cells in output mode, one wants to know how much of a velocity difference exits between the surface and the free stream.

To solve this problem, in exemplary implementations of this invention, cells operating in input mode are interspersed with cells operating in output mode. This cells operating in input mode may determine the local speed of the boundary layer. For example, this speed may be inferred from the rate at which energy is captured by the cell.

Conventional practice of moving liquids through long lengths of pipeline generates high pressure and high heat in the fluid. This is a result of pumping at one end of the pipe to force the liquid through, despite the loss of speed due to friction effects along the wall of the pipe. The heat generated is a by-product of the frictional interaction with the walls. In the case of some liquids, the heat contributes to greater pressure in the pipe. Among other problems, this may prevent tapping of the line along its path.

In exemplary implementations of this invention, these problems may be mitigated by lining the interior of pipes with cells. These cells may be used to reduce the frictional drag, thereby allowing less pumping pressure to be used at the pipe end. Additionally, cells along the length of the pipe can be used as an in-line pump, adding small amounts of speed to the liquid along the entire length and distributing the pumping force. This reduces the total amount of pumping energy required as well as allowing for offshoot taps along the length of the pipe.

FIG. 17 is a diagram that shows how cells may be used to alter the velocity of a pipe wall to make fluid flow within the pipe more laminar, in an exemplary implementation of this invention.

A programmable surface that generates shear thrust may be used to advantage in scenarios where it is not desirable to bring the fluid inside or through a thrust generator. Such scenarios may occur, for example, where the fluid contains material that would harm the thrust generator if brought inside it, or where the fluid contains items (such as biologicals) that could be harmed if brought through a thrust generator.

This invention can be implemented in many ways. For example:

This invention may be implemented as a craft with an external surface comprising an array of programmable cells, wherein each cell in the array comprises at least one processor for performing computations, at least one thrust generator for generating thrust, and wires or wireless transceivers for communicating with adjoining cells. Furthermore: (1) the craft may be an aircraft, (2) at least some cells in the array may be adapted to generate thrust in a direction substantially normal to the external surface's local orientation ("normal thrust"), (3) the external surface may be adapted to control the direction of motion and angular orientation of the craft, by varying the relative amount of normal thrust generated by different cells in the array, (4) the array of cells may be adapted to generate a net thrust vector, and the craft may be adapted to cause that net thrust vector to point in any 3D direction relative to the craft's inertial frame of reference, by varying the relative amount of thrust generated by different cells in the array, respectively, (5) cells in the array may be arranged in modular units, each of which modular units comprises one or more cells, (6) the modular units may be connected to each other by detachable interconnections that allow the number of modules in the array to be varied on different flights of the craft, (7) at least some of the modular units may have flexible interconnections with each other, (80 at least some of the flexible interconnections may not be load-bearing, (9) the array of cells may comprise a deformable array for generating and detecting signals, (10) the main body of the craft may be in the shape of a polyhedron with at least four sides, (11) cells in the array may be adapted to generate thrust in a direction substantially parallel to the external surface's local orientation ("shear thrust"), (12) the external surface may be adapted to control the direction of motion or angular orientation of the craft, by varying the relative amount of shear thrust generated by different cells in the array, and (13) the craft may be a watercraft, boat, ship or other marine vessel.

This invention may be implemented as a method of propulsion and control of a craft, which craft has at least one external surface comprising a plurality of units, each of which units comprises at least one processor for performing computations, at least one actuator for generating thrust, and wires or wireless transceivers for communicating with neighboring cells, which method comprises, in combination: (a) propelling the craft by causing at least some units in the plurality of units to generate thrust, and (b) controlling the motion and orientation of the craft by varying the amount of thrust generated by the at least some units, respectively. Furthermore, in this method: (1) the craft may be an aircraft and some of the units may be adapted to generate thrust in a direction substantially normal to the external surface's local orientation, and (2) the craft may be a watercraft, boat, ship or other marine vessel and some of the units may be adapted to generate thrust in a direction substantially parallel to the craft's direction of motion.

This invention may be implemented as a surface adapted to interface with a fluid, which surface comprises a plurality of modules that are each adapted to perform computations, to communicate electronically with neighboring modules, and to either transmit kinetic energy to, or absorb kinetic energy from, the fluid. Furthermore: (1) the surface may be on the interior of a pipe and the modules may be adapted to accelerate fluid in the pipe, and (2) the modules may be adapted to absorb kinetic energy from the fluid as the fluid moves past the modules.

Conclusion

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A craft with an external surface comprising an array of programmable cells, wherein each cell in the array comprises at least one processor for performing computations, at least one thrust generator for generating thrust, and wires or wireless transceivers for communicating with adjoining cells.

2. The craft of claim 1, wherein the craft is an aircraft.

3. The craft of claim 1, wherein at least some cells in the array are adapted to generate thrust in a direction substantially normal to the external surface's local orientation.

4. The craft of claim 3, wherein the external surface is adapted to control the direction of motion and angular orientation of the craft, by varying the relative amount of thrust generated by different cells in the array.

5. The craft of claim 3, wherein the array of cells is adapted to generate a net thrust vector, and wherein the craft is adapted to cause that net thrust vector to point in any 3D direction relative to the craft's inertial frame of reference, by varying the relative amount of thrust generated by different cells in the array, respectively.

6. The craft of claim 3, wherein cells in the array are arranged in modular units, each of which modular units comprises one or more cells.

7. The craft of claim 6, wherein the modular units are connected to each other by detachable interconnections that allow the number of modules in the array to be varied on different flights of the craft.

8. The craft of claim 6, wherein at least some of the modular units have flexible interconnections with each other.

9. The craft of claim 8, wherein at least some of the flexible interconnections are not load-bearing.

10. The craft of claim 8, wherein the array of cells comprises a deformable array for generating and detecting signals.

11. The craft of claim 3, wherein the craft has a main body, and the main body is in the shape of a polyhedron with at least four sides.

12. The craft of claim 1, wherein cells in the array are adapted to generate thrust in a direction substantially parallel to the external surface's local orientation.

13. The craft of claim 12, wherein the external surface is adapted to control the direction of motion or angular orientation of the craft, by varying the relative amount of thrust generated by different cells in the array.

14. The craft of claim 12, wherein the craft is a watercraft, boat, ship or other marine vessel.

15. A method of propulsion and control of a craft, which craft has at least one external surface comprising a plurality of units, each of which units comprises at least one processor for performing computations, at least one actuator for generating thrust, and wires or wireless transceivers for communicating with neighboring cells, which method comprises, in combination:
propelling the craft by causing at least some units in the plurality of units to generate thrust, and
controlling the motion and orientation of the craft by varying the amount of thrust generated by the at least some units, respectively.

16. The method of claim 15, wherein the craft is an aircraft and the at least some units are adapted to generate thrust in a direction substantially normal to the external surface's local orientation.

17. The method of claim 15, wherein the craft is a watercraft, boat, ship or other marine vessel and the at least some units are adapted to generate thrust in a direction substantially parallel to the craft's direction of motion.

* * * * *